US007663630B2

(12) United States Patent
Kim et al.

(10) Patent No.: US 7,663,630 B2
(45) Date of Patent: Feb. 16, 2010

(54) APPARATUS AND METHOD FOR PROCESSING COLLISION INFORMATION IN GRAPHIC SYSTEM

(75) Inventors: Do-Hyung Kim, Daejon (KR); Seung-Woo Nam, Daejon (KR); In-Ho Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 461 days.

(21) Appl. No.: 11/634,030

(22) Filed: Dec. 5, 2006

(65) Prior Publication Data

US 2007/0132766 A1    Jun. 14, 2007

(30) Foreign Application Priority Data

Dec. 8, 2005   (KR) .................. 10-2005-0119396
Aug. 8, 2006   (KR) .................. 10-2006-0074924

(51) Int. Cl.
*G06T 15/70*   (2006.01)

(52) U.S. Cl. ................ 345/473; 345/419; 345/421; 345/422; 345/424; 345/426; 345/958; 345/959; 345/629

(58) Field of Classification Search ............ 345/419, 345/422, 423, 473, 474, 629, 958, 959, 421, 345/424, 426
See application file for complete search history.

(56) References Cited

U.S. PATENT DOCUMENTS 5,812,138 A    9/1998 Devic (Continued)

FOREIGN PATENT DOCUMENTS

JP    07-105409    4/1995

(Continued)

OTHER PUBLICATIONS

"Hardware Accelerated Collision Detection—An Architecture and Simulation Results." Andreas Raabe et al. IEEE Proceedings of the Design, Automation and Test in Europe Conference and Exhibition (Date'05). Mar. 2005. vol. 3, pp. 130-135.

(Continued)

*Primary Examiner*—Kimbinh T Nguyen
(74) *Attorney, Agent, or Firm*—Ladas & Parry LLP

(57) ABSTRACT

An apparatus processes collision information in a graphic system, and includes a first storage unit for loading geometry information of primary and secondary object graphics inputted from outside, and outputting the geometry information of the primary object graphics and geometry information of a plurality of secondary object graphics in which a collision detection operation with the primary object graphics is to be performed; a transformer for transforming coordinates of the secondary object graphics to be coincided with a coordinate system that is based on the primary object graphics; a processor for acquiring a collision point, collision presence information, and a collision depth between the primary and the secondary object graphics simultaneously based on the geometry information of the inputted primary object graphics and that of each of the coordinate-transformed secondary object graphics by using a collision detection operation technique determined by the geometry information properties of the primary and the secondary object graphics; a second storage unit for storing the collision information separately, wherein the collision depths before/after update are stored in two areas separately; and an updating unit for updating the collision point and the collision presence information whenever they are newly outputted from the processor, wherein the collision depth is updated based on the result of comparison with the previously stored collision depth.

13 Claims, 14 Drawing Sheets

U.S. PATENT DOCUMENTS 6,862,026 B2    3/2005   Zachmann
2006/0122819 A1*  6/2006  Carmel et al. .................. 703/21

FOREIGN PATENT DOCUMENTS

| JP | 09-231396 | 9/1997 |
|---|---|---|
| JP | 10-247252 | 9/1998 |
| JP | 2003-109038 | 4/2003 |
| JP | 2003-346186 | 12/2003 |

OTHER PUBLICATIONS

"RPU: A Programmable Ray Processing Unit for Realtime Ray Tracing." Sven Woop et al. ACM transactions on Graphics. Aug. 2005. vol. 24, pp. 434-444.

Notice of Korean Patent Grant dated Oct. 29, 2007 for the corresponding application KR10-2006-00749214.

* cited by examiner

APPARATUS AND METHOD FOR PROCESSING COLLISION INFORMATION IN GRAPHIC SYSTEM

FIELD OF THE INVENTION

The present invention relates to an apparatus and method for processing collision information in graphic systems; and more particularly, to an apparatus and method for supporting collision detection between various objects and capable of rapidly and easily acquiring a collision point, collision presence information and a collision depth by employing an efficient collision detection technique.

DESCRIPTION OF RELATED ART

In graphic systems, overlapping (collision) information generally refers to information occupied by one or more objects within one space. In another perspective, overlapping information implies information calculated by judging whether a boundary of an object is invaded by other objects, that is, by collision detection.

As conventional collision detection techniques, there are collision detection techniques using a tree traversal method and a Z-buffer, and so on. Hereinafter, a brief description of each of the above-mentioned prior arts and its problems will be described.

The collision detection technique using the three traversal method segments a bounding box surrounding an outline of an object into smaller bounding boxes to create a hierarchical tree structure so as to perform collision detection between axis alignment bounding boxes along the hierarchical tree of two objects.

Such a conventional technique efficiently performs the collision detection by segmenting the object into the bounding boxes and using the hierarchical tree structure for a static object. However, the conventional technique is problematic that it performs the collision detection by recalculating the bounding boxes whenever a state of an object is changed and a hierarchical structure is reconstructed for a dynamic object.

Meanwhile, the collision detection technique comparing a depth value through the Z-buffer judges the collision of two objects by comparing Z depth information stored in a collision detection unit with current depth information.

This conventional technique acquires only the simple collision presence information as its result, but does not acquire a collision point and a collision depth, in addition to the collision presence information.

SUMMARY OF THE INVENTION

It is, therefore, a primary object of the present invention to provide an apparatus and method for supporting collision detection between various objects and capable of rapidly and easily acquiring a collision point, collision presence information, and a collision depth through the use of an efficient collision detection technique.

In accordance with one aspect of the present invention, there is provided an apparatus for processing collision information in a graphic system, including: a collision object information storage unit for loading geometry information of primary object graphics and secondary object graphics inputted from outside, and outputting the geometry information of the primary object graphics and geometry information of a plurality of secondary object graphics in which a collision detection operation with the primary object graphics is to be performed; a collision object information transformer for transforming coordinates of the secondary object graphics to be coincided with a coordinate system that is based on the primary object graphics; a collision information operation processor for acquiring a collision point, collision presence information, and a collision depth between the primary object graphics and the secondary object graphics simultaneously based on the geometry information of the inputted primary object graphics and the geometry information of each of the coordinate-transformed secondary object graphics by using a collision detection operation technique determined by the geometry information properties of the primary object graphics and the secondary object graphics; a collision information storage unit for storing the collision point, the collision presence information, and the collision depth separately, wherein the collision depths before/after update are stored in two areas separately; and a collision information updating unit for updating the collision point and the collision presence information whenever they are newly outputted from the collision information operation processor, wherein the collision depth is updated based on the result of comparison with the previously stored collision depth.

In accordance with another aspect of the present invention, there is provided a method for processing collision information in a graphic system, including the steps of: loading geometry information of primary object graphics and secondary object graphics inputted from outside, and outputting the geometry information of the primary object graphics and geometry information of a plurality of secondary object graphics in which a collision detection operation with the primary object graphics is to be performed; transforming coordinates of the secondary object graphics to be coincided with a coordinate system that is based on the primary object graphics; acquiring a collision point, collision presence information, and a collision depth between the primary object graphics and the secondary object graphics simultaneously based on the geometry information of the inputted primary object graphics and the geometry information of each of the coordinate-transformed secondary object graphics by using a collision detection operation technique determined by the geometry information properties of the primary object graphics and the secondary object graphics; storing the collision point, the collision presence information, and the collision depth separately, wherein the collision depths before/after update are stored in two areas separately; and updating the collision point and the collision presence information whenever they are newly outputted from the acquiring step, wherein the collision depth is updated based on the result of comparison with the previously stored collision depth.

The overlapping information calculation or collision tracing (hereinafter, "collision detection") procedure has a parallel-processed operation property. If an N number of objects are existed, an n×n number of collision checking operations are carried out and can be simultaneously and individually processed, without needing to consider interdependency.

If this collision detection is implemented by hardware, the present invention can accomplish data exchange minimization between a dedicated hardware and CPU, reusability maximization of data loaded in the dedicated hardware, and reusability maximization of results calculated by the dedicated hardware. Further, the invention can solve a design issue such as bottleneck minimization in the step of storing the results calculated by the dedicated hardware.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be more apparent by the following detailed description associated with the accompanying drawings, and thus, the technical spirit of the invention will be readily conceived by those skilled in the art to which the invention pertains. Further, in the following description, well-known arts will not be described in detail if it appears that they could obscure the invention in unnecessary detail. Hereinafter, preferred embodiments of the present invention will be set forth in detail with reference to the accompanying drawings.

Figure 1A:
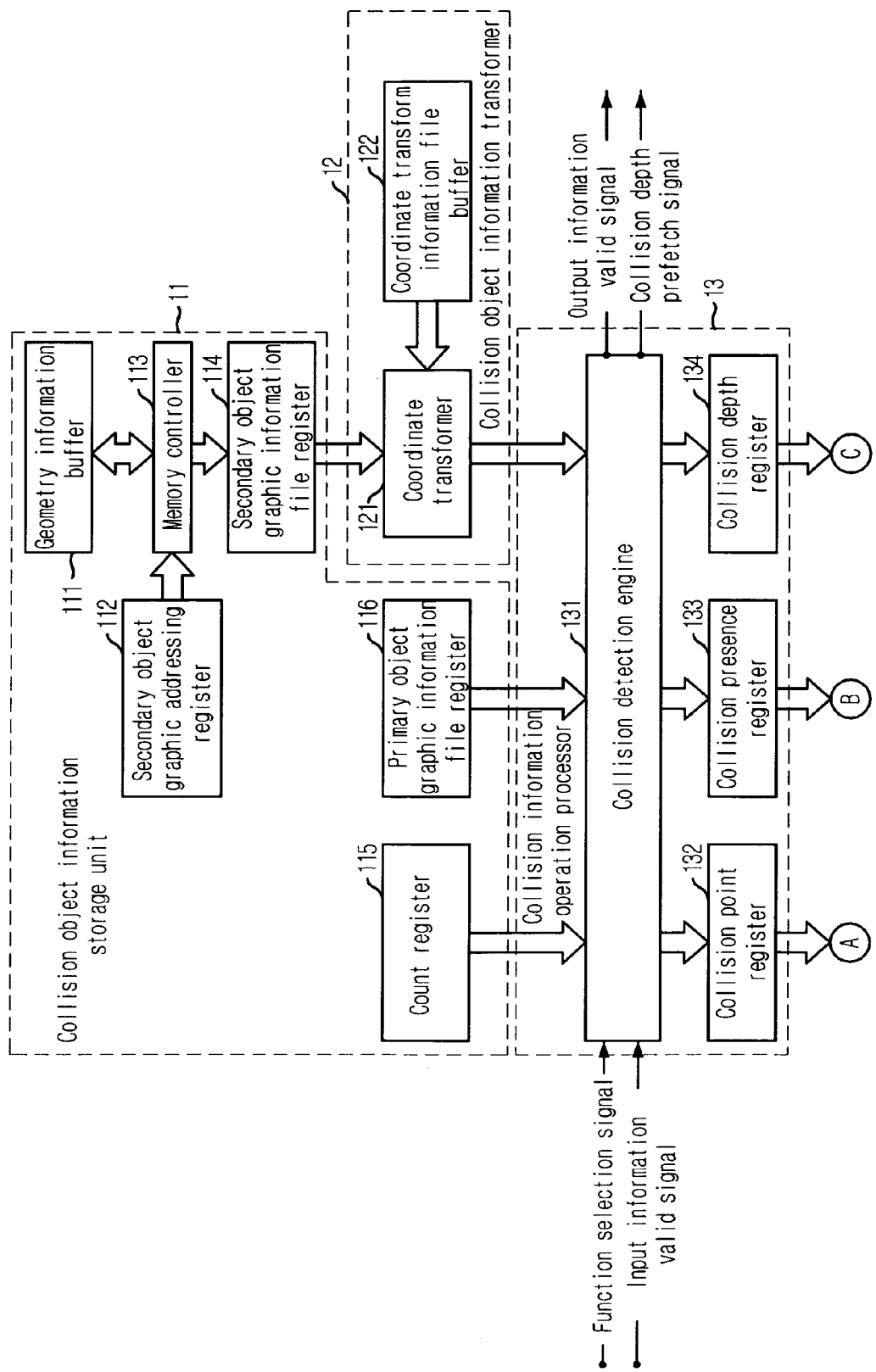
FIGS. 1A and 1B are diagrams showing a configuration of a collision information processing apparatus in a graphic system in accordance with a preferred embodiment of the invention.
Figure 1B:
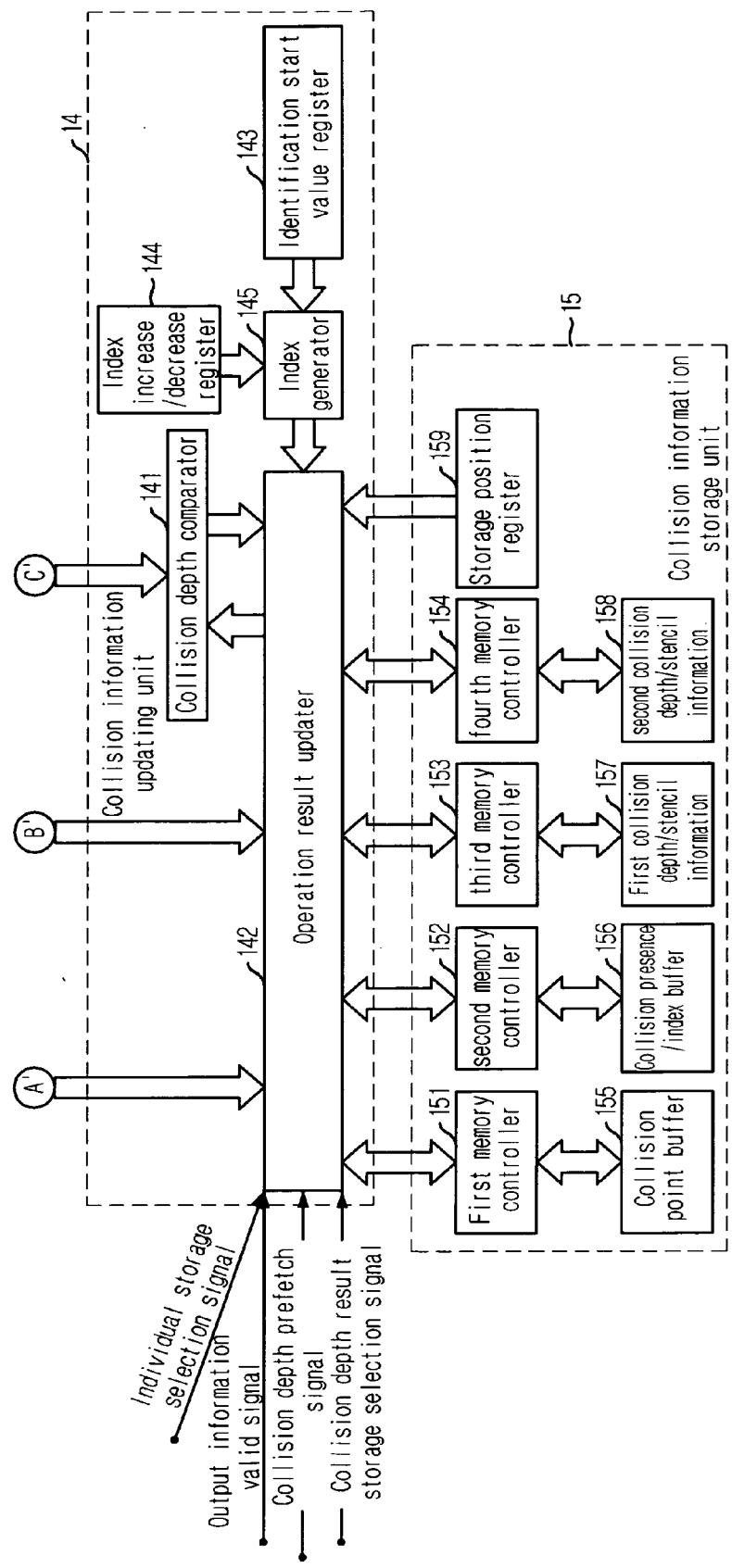

FIGS. 1A and 1B are block diagrams showing a configuration of a collision information processing apparatus in a graphic system in accordance with a preferred embodiment of the invention, wherein FIGS. 1A and 1B represented by two figures are connected to each other. That is, A of FIG. 1A is connected to A' of FIG. 1B, B of FIG. 1A to B' of FIG. 1B, and C of FIG. 1A to C' of FIG. 1B, respectively.

The collision information processing apparatus in the graphic system shown in FIGS. 1A and 1B includes a collision object information storage unit 11, a collision object information transformer 12, a collision information operation processor 13, a collision information updating unit 14, and a collision information storage unit 15.

The collision object information storage unit 11 is provided with a geometry information buffer 111, a secondary object graphic addressing register 112, a memory controller 113, a secondary object graphic information file register 114, a count register 115, and a primary object graphic information file register 116.

The geometry information buffer 111 loads secondary object graphic geometry information from outside in an initial collision detection procedure for data exchange minimization between a dedicated hardware and CPU. This geometry information implies geometry information that is not changed during the collision operation. The geometry information buffer 111 stores data repeatedly used during the operation procedure, which does not need to perform the repeated loading (uploading) procedure after the geometry information is loaded in the dedicated hardware in an initial application program.

The secondary graphic addressing register 112 stores an addressing register value for the secondary object graphic geometry information loaded in the geometry information buffer 111.

The memory controller 113 functions to fetch geometry information of the primary object graphic, and a plurality of secondary object graphics, in which the collision detection operation is to be performed, from the geometry information buffer 111 based on the secondary object graphic addressing register value stored in the secondary object graphic addressing register 112.

The secondary object graphic information file register 114 stores the secondary object graphic geometry information fetched from the geometry information buffer 111. This information fetch procedure is to minimize data exchange by the information fetch procedure by permitting the geometry information buffer 111 to store the secondary object graphic geometry information in advance, and also to minimize data exchange between the dedicated hardware and the CPU by reducing a waiting time of the dedicated hardware for data supplying and loading.

The primary object graphic information file register 115 loads the primary object graphic geometry information from the outside. Further, it stores information file related to the primary object graphic corresponding to the first object in the collision of two objects.

The count register 116 stores the number of the primary object graphics and the number of the secondary object graphics. These numbers of the graphics are multiplied to obtain the number of times of collision operations. The overlapping information calculation or collision tracking (i.e., collision detection) has a parallel-processed operation property. If an N number of objects are existed, an n×n number of collision checking operations should be performed. Theses operations are allowed to be simultaneously and individually processed, without considering interdependency. The count register 116 stores the number of the object graphics, thereby calculating a total number of collision operations.

In the meantime, the collision object information transformer 12 is comprised of a coordinate transformer 121 and a coordinate transform information file buffer 122.

The coordinate transformer 121 transforms a coordinate of the secondary object graphic to be coincided with a coordinate system that is based on the primary object graphic according to the coordinate transform information, and provides the geometry information of the coordinate-transformed secondary object graphic to the collision information operation processor 13. In other words, for maximization of reusability of data loaded in the dedicated hardware, the coordinate transformer 121 copies objects on an object coordinate system and applies them to a world coordinate system if the objects on the object coordinate system are plurally existed on the world coordinate system. More specifically, the coordinate transformer 121 is to reuse the plurality of object information if they are existed.

For example, the chairs and desks in the classroom are the same objects on the object coordinate system, and these chairs and desks are plurally existed within the space such as the classroom (the world coordinate system). All of these chairs and desks are not treated separately and a copying concept is introduced thereto, thereby saving the storage space of the geometry information buffer 111 and also improving the execution performance of hardware. Further, only single chair data is stored in the geometry information buffer 111, without storing all of the plurality of chair data separately, and the coordinate transform is applied thereto, thereby maximizing the reuse of loaded data The coordinate transform information file buffer 122 receives and stores, from the outside, the coordinate transform information to be transformed in the coordinate transformer 121, and to transform the coordinate of the secondary object graphic to be coincided with a coordinate system that is based on the primary object graphic. For instance, when a triangle is indicative of person's arms, such triangle spatially moves according to the person's walking or movement of arms. The coordinate transformer 121 is prepared for spatial processing, and the information stored in the secondary object graphic information file register 114 is delivered to the coordinate transformer 121. At this time, the coordinate transform information file buffer 122 stores a basic value for the coordinate transform, i.e., coordinate transform information (for example, movement information or rotation information), and forwards the same to the coordinate transformer 121.

The collision information operation processor 13 includes a collision detection engine 131, a collision point register 132, a collision presence register 133, and a collision depth register 134. Briefly explaining, the collision information operation processor 13 acquires a collision point, collision presence information and a collision depth between the primary object graphic and the secondary object graphic simultaneously by using the inputted primary object graphic geometry information and the coordinate-transformed secondary object graphic geometry information based on a collision detection operation technique decided by the geometry information properties of the primary object graphic and the secondary object graphic.

The collision detection engine 131 determines the collision detection technique depending on the primary object graphic geometry information loaded from the primary object graphic information file register 115 and a function selection signal for the secondary object graphic geometry information transformed by the coordinate transformer 121. The collision detection engine 131 performs the collision information detection operation using the determined collision detection technique to thereby acquire a collision point indicating a position at which objects are collided, collision presence information denoting whether the collision is occurred, and a collision depth representing the degree that the collided objects are overlapped with each other.

The function selection signal inputted at the time of collision detection is related to configuration information on the inputted primary object graphic and the secondary object graphic. The collision detection engine 131 grasps a configuration for the inputted object graphic geometry information based on the function selection signal to determine the collision detection calculation technique necessary at the time of the collision detection.

In view of the hardware properties, the data fetched from the memory reaches the collision detection engine 131 after a certain period of time. Accordingly, the input information valid signal is used to perform a function of checking whether the currently inputted value is valid data.

Further, the collision detection engine 131 outputs a valid value, i.e., an output information valid signal, after a certain period of time depending on the collision detection object, to inform whether a signal outputted from the collision information operation processor 13 is valid or not.

It is required that the collision operation output value be compared with a previously stored value. The collision detection engine 131 functions to fetch the previously stored value in advance since a delay time is needed in order to output a collision depth prefetch signal and fetch the previous value.

The collision point register 132, the collision presence register 133, and the collision depth register 134 store the collision point result, new collision presence result, and new collision depth result detected by the collision detection engine 131, respectively.

The collision information updating unit 14 is provided with a collision depth comparator 141, an operation result updater 142, an identification start value register 143, an index increase/decrease register 144, and an index generator 145. Briefly explaining, the collision information updating unit 14 updates the collision point and the collision presence information each time they are newly outputted from the collision information operation processor 13, and updates the collision depth depending on the result of comparison with the previously stored collision depth.

The collision depth comparator 141 fetches the previously stored collision depth and compares it with the new collision depth result stored in the collision depth register 134 according to a comparison mode. For example, the comparison mode may be any one selected among "less than", "less than or equal", "equal", "equal", "not equal", "greater than", and "greater than or equal", in response to a comparison method selection signal.

The operation result updater 142 updates the collision point and collision presence information whenever they are newly issued from the collision information operation processor 13, and updates the collision depth depending on the comparison result with the previously stored collision depth in the collision depth comparator 141. That is, it serves to store the three operation results by the collision depth comparator 141 in corresponding storage units to thereby update them. The operation result updater 142 updates the previous collision point with the outputted collision point, the previous collision presence information and collision object index with the outputted collision presence information and created collision object index, and the previous collision depth with the collision depth corresponding to the comparison result.

Further, the operation result updater 142 stores a part of the three operation results in response to an individual storage selection signal if it is required to store only the part of the results.

The identification start value register 143 designates an initial value of the collision object index. Here, the collision object index is stored together with the collision presence result as one body.

The index increase/decrease register 144 designates the increase/decrease of the collision object index in such a manner that its value is increased by 1 and stored whenever the operation result is stored or the same value is stored.

The index generator 145 receives the designated initial value of the collision object index from the identification start value register 143, and creates a collision object index depending on the increase/decrease of the collision object index designated by the index increase/decrease register 144. The index generator 145 delivers the created collision object index to the operation result updater 142.

The collision information storage unit 15 stores the collision point, collision presence information and collision depth separately, and includes first to fourth memory controllers 151 to 154, a collision point buffer 155, a collision presence/index buffer 156, first and second collision depth/stencil information buffers 157 and 158, and a storage position register 159.

Simply explaining, the collision information storage unit 15 incorporates therein the buffers 155 to 158 for the collision point, collision presence and collision depth in order to maximize the reusability for the results calculated by the dedicated hardware. By being provided with each of the buffers 155 to 158 and the collision depth comparator 141, it is possible to reapply repeated operation for operation results.

Further, the collision information storage unit 15 stores the collision point, collision presence information and collision depth separately, wherein the two storage areas (the first and second collision depth/stencil information buffers 157 and 158) are prepared to store the collision depths before/after update separately.

The first to fourth memory controllers 151 to 154 control the buffers 155 to 158 to store the results of the collision point, collision presence information and collision depth updated by the operation result updater 142 in the corresponding buffers 155 to 158.

The collision point buffer 155 accepts the collision point from the operation result updater 142 and then stores it.

The collision presence/index buffer 156 takes the collision presence information/index from the operation result updater 142 and then stores the same.

The first and second collision depth/stencil information buffers 157 and 158 store the collision depth result using two buffers 0 and 1, wherein the comparison result is read from the buffer 0 and stored in the buffer 1, and vice versa. This buffer selection is determined by the collision depth result storage selection signal.

Specifically, the first and second collision depth/stencil information buffers 157 and 158 employ the above-mentioned two buffers for storing the collision depth, thereby minimizing the bottleneck in the step of storing the result calculated by the dedicated hardware. If the buffer related to the collision depth is one, it needs twice the read/write operations for comparison and writing procedure of the new operation result and the existing result. Accordingly, double operation speed is required for such read/write procedure. In this case, since the double operation speed is impossible, execution operation speed should be lowered to ½. However, the present invention employs the two buffers for the collision depth, thereby making it possible to compare the new operation result with the existing data and write the result even at the same operation speed.

The storage position register 159 stores the position information of the collision point result, the collision presence result and the collision depth result to be stored in the corresponding buffers.

The following is a detailed description of a collision information processing method in a graphic system in accordance with a preferred embodiment of the invention, wherein a collision detection procedure for a segment and a triangle is illustrated.

First of all, it is assumed that a collision detection is made for 10 line segments and 10 triangles where the former 10 line segments are primary object graphics and the latter 10 triangles are secondary object graphics.

Then, the geometry information of the 10 triangles is stored in the geometry information buffer 111. The geometry information required for the collision detection is stored in the secondary object graphic information file register 114 under the control of the memory controller 113 based on the value stored in the secondary object graphic addressing register 112.

Considering that the 10 triangles indicate the person's arms, these triangles spatially move according to the person's walking or movement of arms. For this spatial process, the coordinate transformer 121 is prepared and the value of the secondary object graphic information file register 114 is conveyed to the coordinate transformer 121. At this time, the basic value for coordinate transform, i.e., information on how they moved and rotated is provided to the coordinate transformer 121 through the coordinate transform information file buffer 122.

The geometry information of the 10 line segments is stored in the primary object graphic information file register 115 and the information on the number 10 is stored in the count register 116.

Then, the collision detection engine 131 performs the collision detection operation for the first line segment and the 10 triangles, and thereafter, continues to perform the collision detection operation for the 10 triangles in the order of the second and third line segments.

Although the preferred embodiment of the invention is made with respect to the line segments and triangles, it is possible to use various graphics such as regular hexahedron and triangular pyramid as the input object graphic. The information on such collision objects is forwarded to the collision detection engine 131 through the function selection signal. Then, the collision detection engine 131 grasps the geometry information of the inputted primary object graphic or secondary object graphic based on the function selection signal to thereby determine the collision detection technique.

In terms of the hardware properties, the data fetched from the memory is inputted to the collision detection engine 131 after a certain period of time. Accordingly, it needs a signal informing whether the currently inputted value is valid information, wherein the signal of performing such function is the input information valid signal.

Further, the collision detection engine 131 outputs a valid value, after a certain time period, depending on the collision detection object. That is, the valid value serves to inform whether or not a signal outputted from the collision information operation processor 13 is valid by using an output information valid signal.

The collision detection output value is compared with a value that is previously computed and stored. The collision depth prefetch signal is a signal to fetch the previously stored value in advance since a delay time is needed to fetch the previous value.

The collision detection engine 131 outputs the collision point result, collision presence result, and collision depth result, and these three operation results are stored in the collision point register 132, the collision presence register 133 and the collision depth register 134.

The collision depth comparator 141 fetches the previously stored collision depth and compares it with the collision depth result. The comparison mode may be any one selected among "less than", "less than or equal", "equal", "equal", "not equal", "greater than" and "greater than or equal", in response to the comparison method selection signal.

The three operation results from the collision depth comparator 141 are stored in the corresponding buffers. If it is intended to store only a part thereof, they are stored separately in response to an individual storage selection signal.

Further, the buffers storing the collision depth are two, one of which is the first collision depth/stencil information buffer 157 and the other of which is the second collision depth/stencil information buffer 158. The collision information updating unit 14 fetches the previous collision depth from the first collision depth/stencil information buffer 157 in response to a collision depth result storage selection signal, and stores the same in the second collision depth/stencil information buffer 158, and vice versa. Further, the storage position register designates a position of each of the buffers storing the collision results.

Here, the information stored along with the operation results are the collision information index and the stencil information. The stencil information is a value delivered to the collision depth comparator 141, and the collision information index is a value stored together with the collision depth as one body. The initial value of the collision information index is designated by the identification start value register 143. Its storage method, as to whether the value is increased by 1 and stored whenever the operation result is stored or the same value is stored, is determined by the index increase/decrease register 144. This collision object index is created by the index generator 143 and then fed to the operation result updater 142.

The collision detection between objects has been used in a Z-buffer test for 3-dimensional graphic data display, hardware for processing ray-tracing of a rendering system at a high speed, a collision detection between objects in physical simulation, and so on. Hereinafter, the graphic system for physical simulation, graphic processing hardware, and ray-tracing graphic system using the collision detection technique in accordance with the invention will be described with reference to FIGS. 2 to 4.

Figure 2:
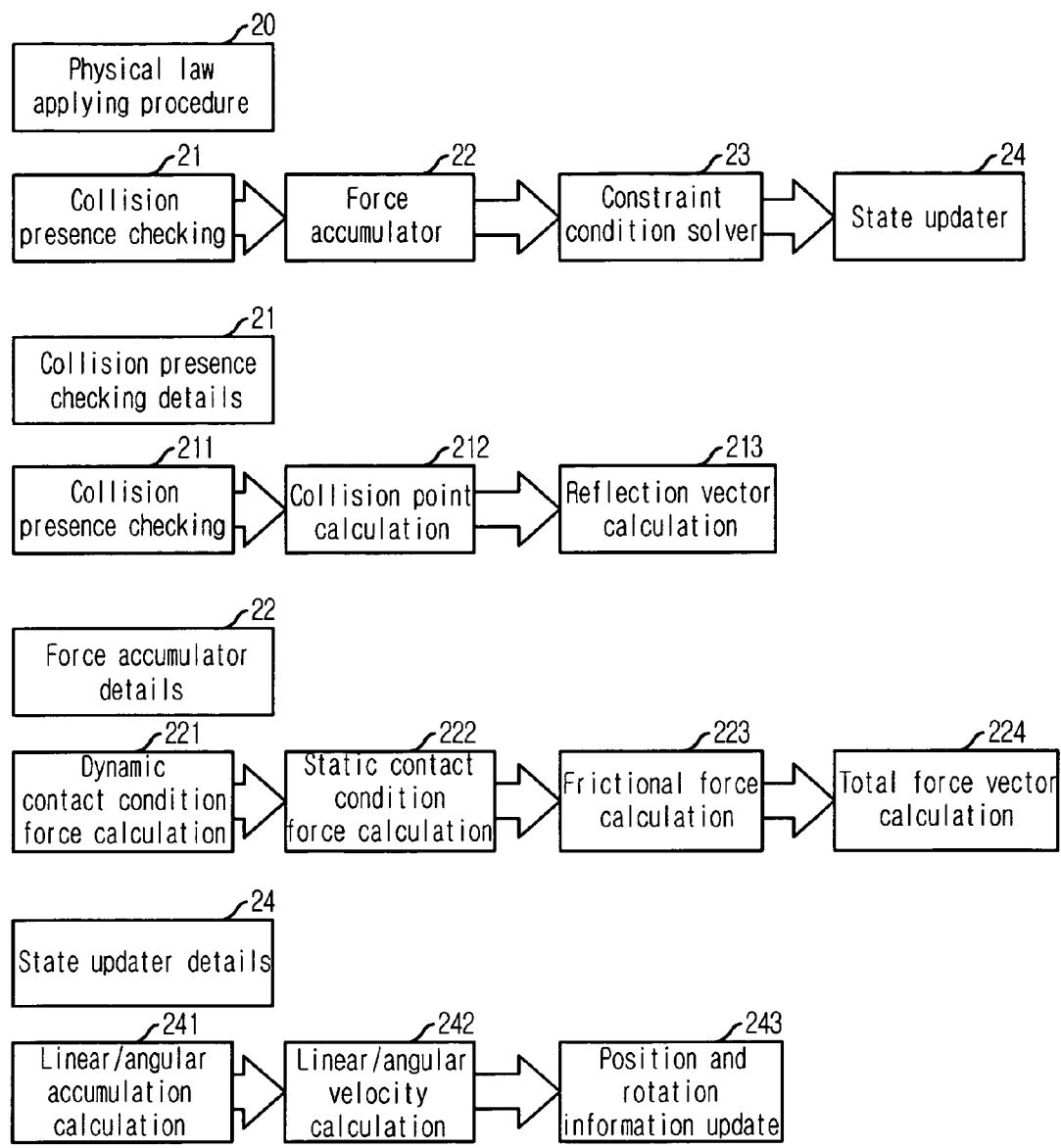
FIG. 2 is a diagram for explaining a graphic system for physical simulation using the collision information processing apparatus in accordance with the invention.

FIG. 2 is a diagram for explaining a graphic system for physical simulation including the collision detection in accordance with the invention.

Indicated by reference numeral 20 is a physical law applying procedure 20 that includes a collision presence checking 21, a force accumulator 22, a constraint condition solver 23 and a state updater 24. This procedure 20 checks a collision presence, and calculates a collision point and a collision length between objects in the three-dimensional space through the collision detection.

A detailed procedure of the collision presence checking 21 includes a collision presence checking 211, a collision point calculation 212 if the collision is occurred, and a reflection vector calculation 213.

In a detailed procedure of the force accumulator 22, a dynamic contact condition force calculation 221, a static contact condition force calculation 222, a frictional force calculation 223 and a total force vector calculation 224 are sequentially performed in that order.

In a detailed procedure of the state updater 24, a linear/angular accumulation calculation 241, a linear/angular velocity calculation 242 and a position and rotation information update 243 are sequentially carried out in that order.

Figure 3:
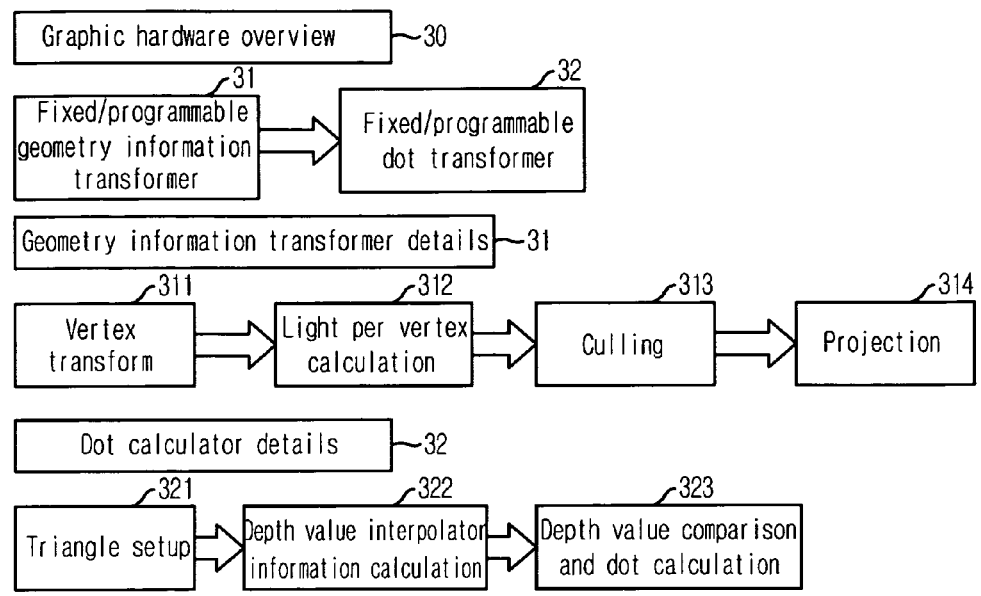
FIG. 3 is a diagram for explaining a graphic processing hardware including a Z-buffer test and ray-tracing in the collision detection in accordance with the invention.

FIG. 3 is a diagram for explaining a graphic processing hardware including a Z-buffer test and ray-tracing in the collision detection in accordance with the present invention.

The collision detection using a graphic pipe has been used in the Z-buffer test and is efficiently performed by the collision depth comparator 141 in accordance with the present invention.

Designated by reference numeral 30 is a graphic hardware overview that includes a fixed/programmable geometry information transformer 31 and a fixed/programmable dot transformer 32.

In a detailed procedure of the fixed/programmable geometry information transformer 31, a vertex transform 311, a light per vertex calculation 312, culling 313 and projection 314 are sequentially conducted in that order.

In a detailed procedure of the fixed/programmable dot transformer 32, a triangle setup 321, a depth value interpolator 322, and a depth value comparison/dot calculation 323 are sequentially performed in that order.

Figure 4:
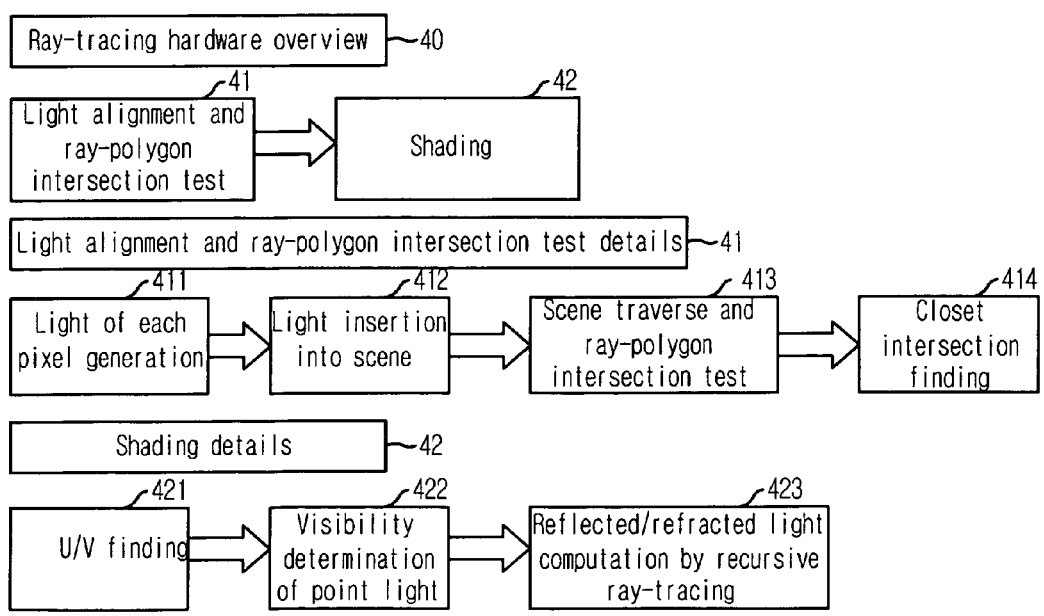
FIG. 4 is a diagram for explaining a ray-tracing graphic system including ray-tracing or collision of light and polygon in the collision detection in accordance with the invention.

FIG. 4 is a diagram for explaining a ray-tracing graphic system including ray-tracing or collision of light and polygon in the collision detection in accordance with the present invention.

The ray-tracing graphic system performs the collision test between ray and polygon for visibility test for lighting, and can efficiently conduct the collision detection between the ray and polygon by using the collision detection engine of the invention.

The ray tracing hardware overview 40 includes ray casting and ray-polygon intersection test 41 and shading 42.

The ray casting and ray-polygon intersection test 41 sequentially performs a ray creation for each pixel 411, a ray cast into scene 412, a scene traverse and ray-polygon intersection test 413, and a closest intersection finding 414 in that order.

In a detailed procedure of the shading 42, a U/V finding and visibility determination of point light 422, and a reflected/refracted light computation by recursive ray-tracing 423 are sequentially carried out in that order.

Figure 5:
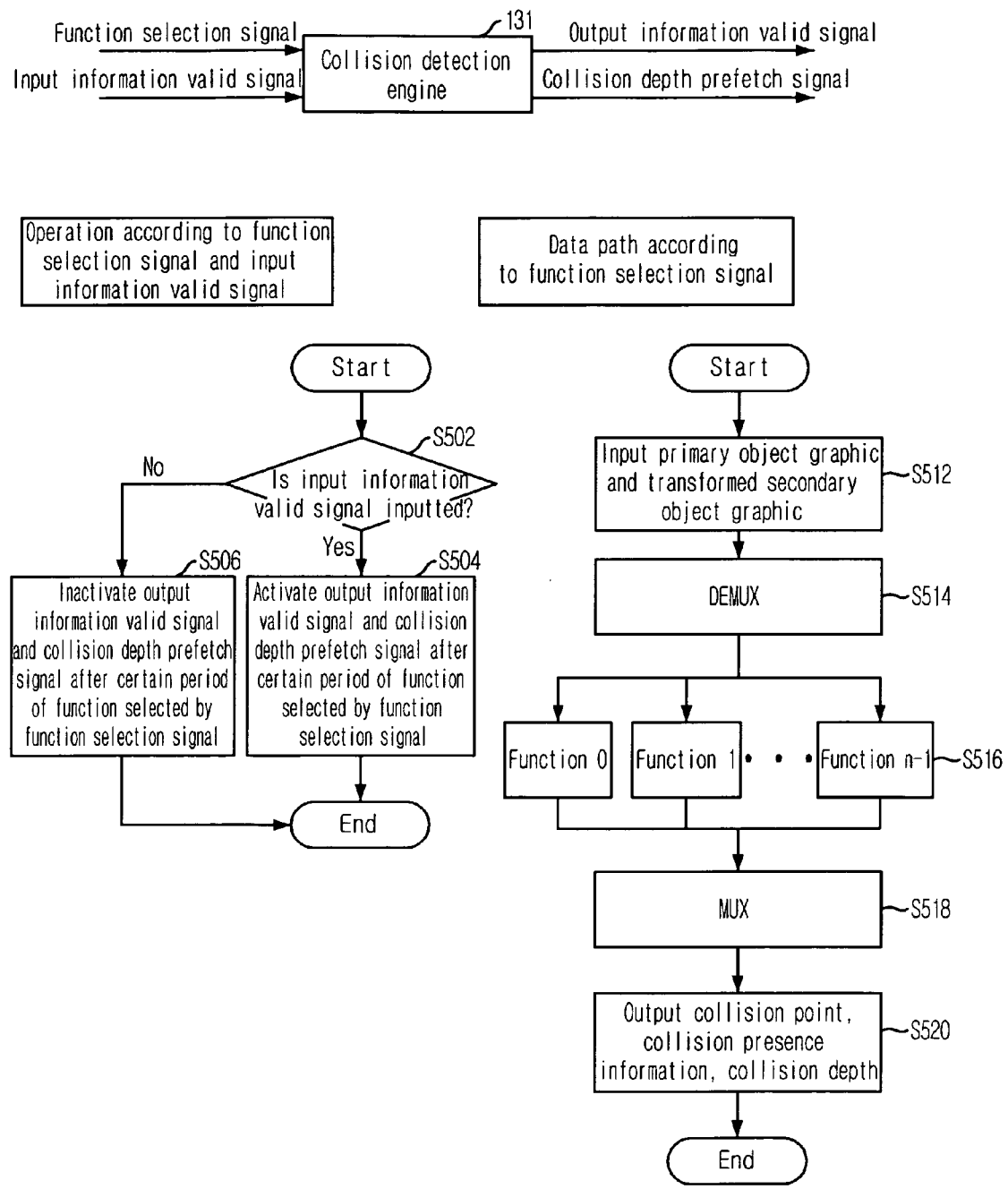
FIG. 5 is a flowchart for describing a collision detection procedure based on a function selection signal and an input information valid signal in the collision information operation processor of FIG. 1A in accordance with the present invention.

FIG. 5 is a flowchart of the collision detection procedure according to the function selection signal and the input information valid signal in the collision information operation processor of FIG. 1A in accordance with the present invention.

In the collision detection procedure depending on the function selection signal and the input information valid signal as shown in FIG. 5, if the input information valid signal is inputted at step S502, the collision detection engine 131 activates the output information valid signal and the collision depth prefetch signal after a certain period according to a function selected by the function selection signal at step S504.

Conversely, if the input information valid signal is not inputted at step S502, the collision detection engine 131 inactivates the output information valid signal and the collision depth prefetch signal after a certain period of a function selected by the function selection signal at step S506.

In the meantime, in the data path procedure by the function selection signal, after the primary object graphic and the modified secondary object graphic related information are inputted at step S512, the function selection signal is inputted to a demultiplexer (DEMUX) at step S514. Then, the functions 0, 1, and n−1 perform the collision detection in response to the inputted function selection signal at step S516, and the detected results are multiplexed by a multiplexer (MUX) at step S518 to output the collision point result, the collision presence result, and the collision depth result at step S520.

Figure 6:
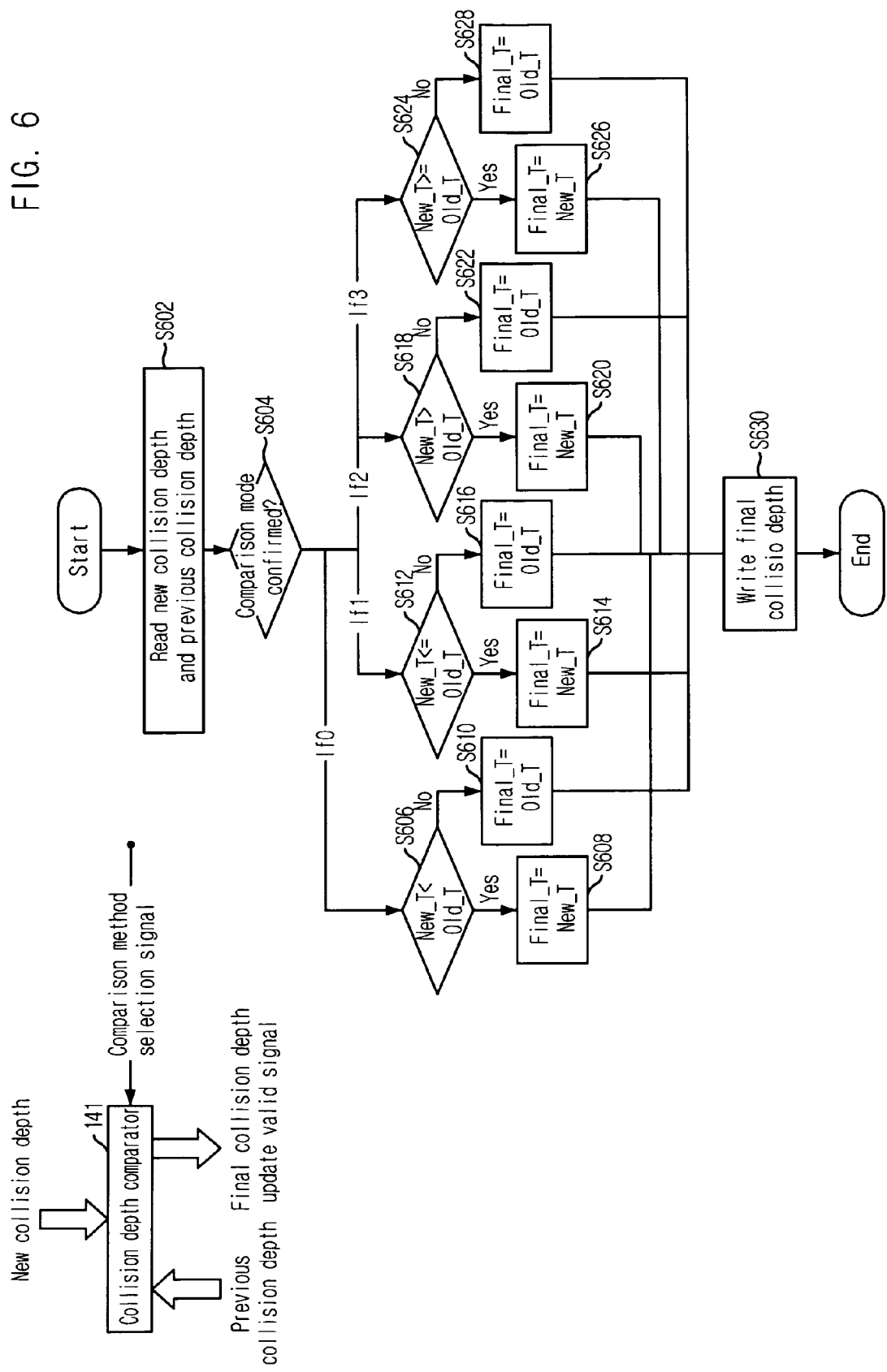
FIG. 6 is a flowchart for describing a comparison procedure in the collision depth comparator of FIG. 1B in accordance with the present invention.

FIG. 6 is a flowchart illustrating the comparison procedure in the collision depth comparator of FIG. 1B in accordance with the present invention.

The collision depth comparator 141 fetches a new collision depth and a previous collision depth at step S602. Then, the collision depth comparator 141 selects the smallest value or the largest value among the collision depths decided by the collision detection engine 131 by using different comparison methods in response to the comparison method selection signal at step S604. The comparison method selection signal has a signal ranging from 0 to 3, and compares the new collision depth with the previous collision depth through the function corresponding to "less than", "less than or equal", "greater than" and "greater than or equal", respectively, at steps S606, S612, S618 and S624.

For example, if the comparison method selection signal is selected as "0" (that is, "less than"), the new collision depth is compared with the previous collision depth at step S606. In the comparison, if the new collision depth is less than the previous collision depth, the new collision depth is decided as the final collision depth at step S608, and if the new collision depth is equal to or greater than the previous collision depth, the previous collision depth is decided as the final collision depth at step S610.

If the comparison method selection signal is selected as "1" (that is, "less than or equal") at step S612, as "2" (that is, "greater than") at step S618, or as "3" (that is, "greater than or equal") at step S624, the final collision depth is determined in the same way.

Thereafter, the final collision depth decided by the comparison method selection signal is written in the collision depth buffer at step 630.

Figure 7A:
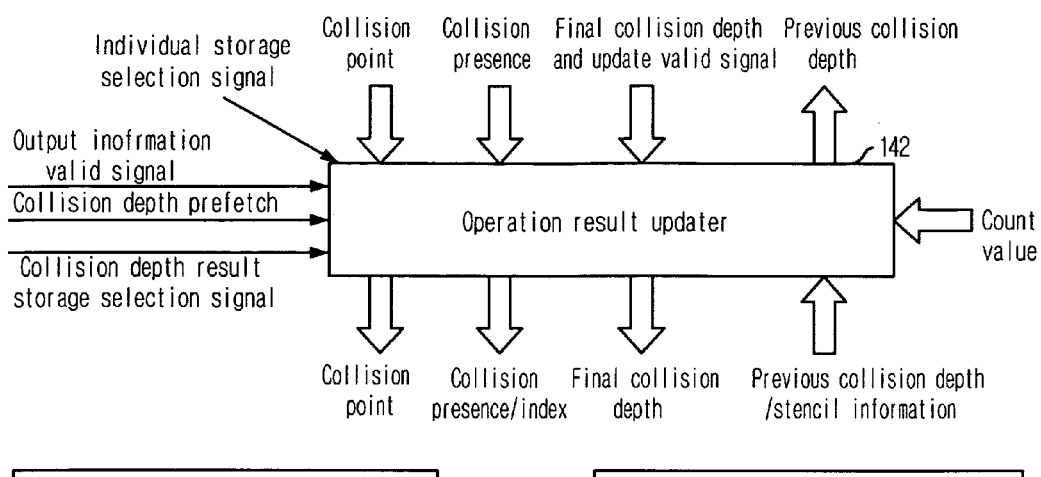
FIGS. 7A and 7B are flowcharts for describing a collision information updating procedure in the collision information updating unit of FIG. 1B in accordance with the invention.
Figure 7A:
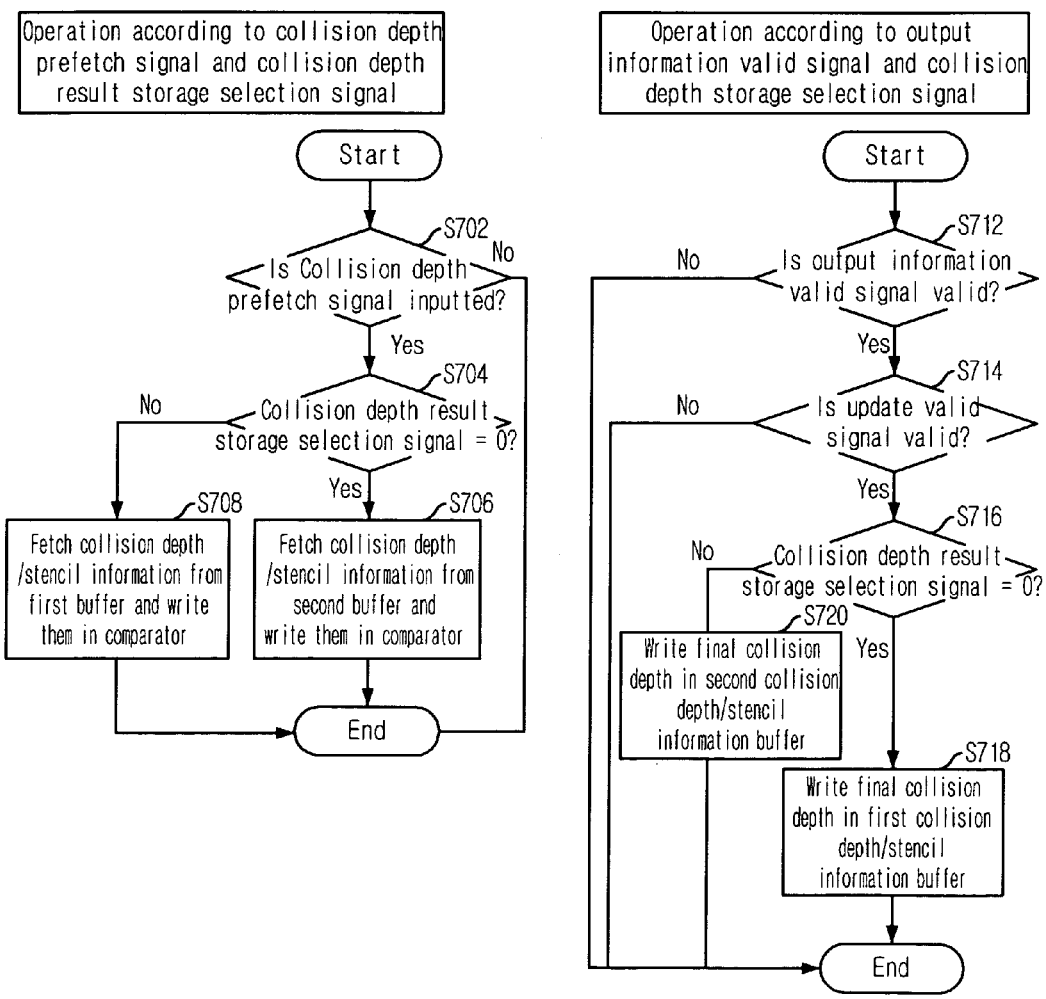
Figure 7B:
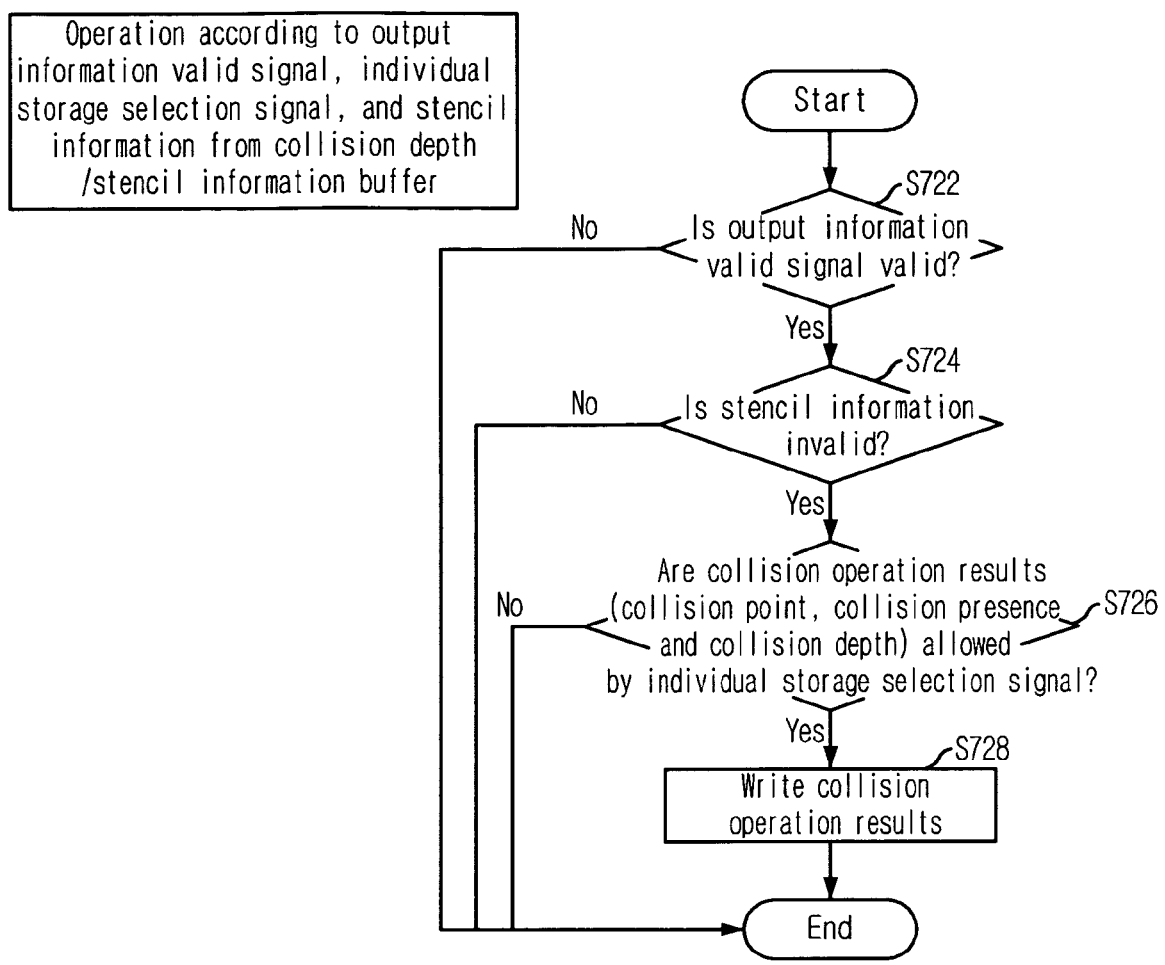

FIGS. 7A and 7B are flowcharts showing a collision information updating procedure in the collision information updating unit of FIG. 1B in accordance with the present invention.

The operation result updater 142 updates the result value outputted from the collision information operation processor 13 in the memory and conveys the previous or old value stored in the memory to the collision depth comparator 141. The operation of the operation result updater 142, which depends on an individual storage selection signal, an output information valid signal, a collision depth prefetch signal, and a collision depth result storage selection signal, will be described with reference to FIG. 7.

First of all, the operation of the operation result updater 142 according to the collision depth prefetch signal and the collision depth result storage selection signal is carried out as follows. That is, if the collision depth prefetch signal is inputted at step S702, it is confirmed whether the collision depth result storage selection signal is 0, and if the collision depth prefetch signal is not inputted, no operation is made therein. Further, if the collision depth result storage selection signal is 0 at step S704, the collision depth is fetched from the second collision depth/stencil information buffer 158 and inputted to the collision depth comparator 141 at step S706. Meanwhile, if the collision depth result storage selection signal is not 0, the collision depth is fetched from the first collision depth/stencil information buffer 157 and inputted to the collision depth comparator 141 at step S708.

Next, the operation of the operation result updater 142 according to the output information valid signal and the collision depth result storage selection signal is conducted as follows. First, it is conformed whether the output information valid signal is valid at step S712, and if so, it is again conformed whether the update valid signal is valid at step S714. If not, no operation is made therein. Subsequently, if the update valid signal is inputted, it is conformed whether the collision depth result storage selection signal is 0 at step S716. If it is 0, the final collision depth result is stored in the first collision depth/stencil information buffer 157 at step S718. But, if it is not 0, the collision depth result is stored in the second collision depth/stencil information storage unit 158 at step S720.

Finally, the operation of the operation result updater 142 according to the output information valid signal, the individual storage selection signal, and the stencil information from the collision depth/stencil information buffer is carried out as follows. First, it is confirmed whether the output information valid signal is valid at step S722. If so, it is confirmed whether the stencil information is invalid at step S724. If the output information valid signal is valid, no operation is made therein. And if the stencil information is invalid, it is confirmed whether each collision operation result (collision point, collision presence or collision depth) is allowed by the individual storage selection signal at step S726. If allowed, the collision operation result is written at step S728, and if not allowed, no operation is made therein.

Figure 8A:
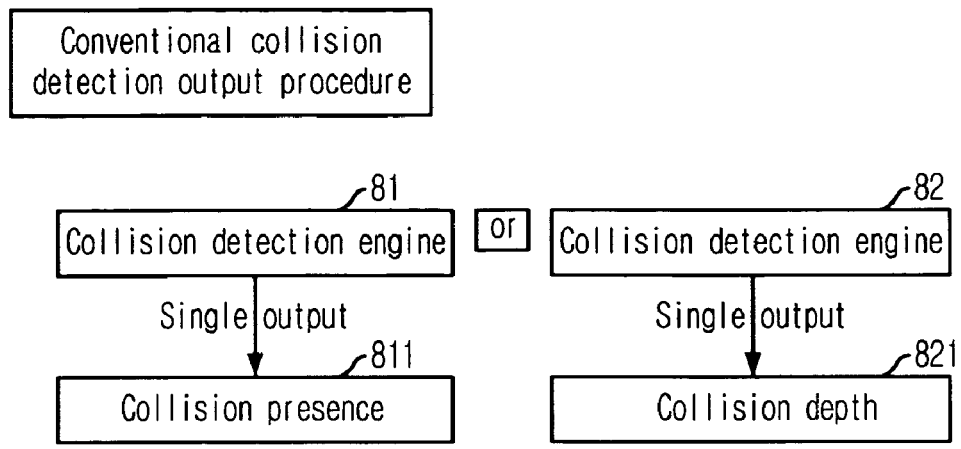
FIG. 8A is a diagram showing a collision detection output procedure in a conventional collision detection engine.
Figure 8B:
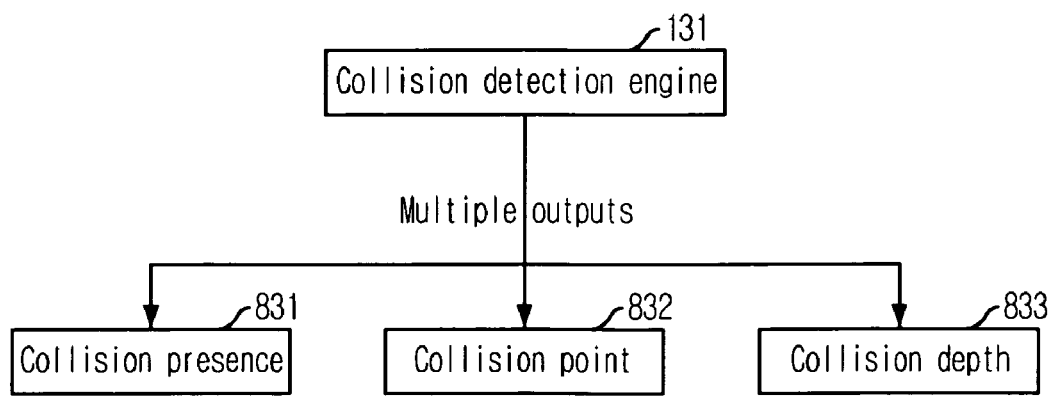
FIG. 8B is a diagram for describing a collision detection output procedure in the collision information operation processor of FIG. 1B in accordance with the invention.

FIG. 8A is a diagram for describing a collision detection output procedure in the conventional collision detection engine, and FIG. 8B is a diagram for describing a collision detection output procedure in the collision information operation processor of FIG. 1B in accordance with the present invention.

The convention collision detection engines 81 and 82, as shown in FIG. 8A, output only one result wherein either the collision presence result 811 or the collision depth result 812 is outputted.

On the other hand, the collision detection engine 131 according to the invention, as shown in FIG. 8B, provides multiple outputs, i.e., the collision point result 831, the collision presence result 832, and the collision depth result 832 together.

Figure 9A:
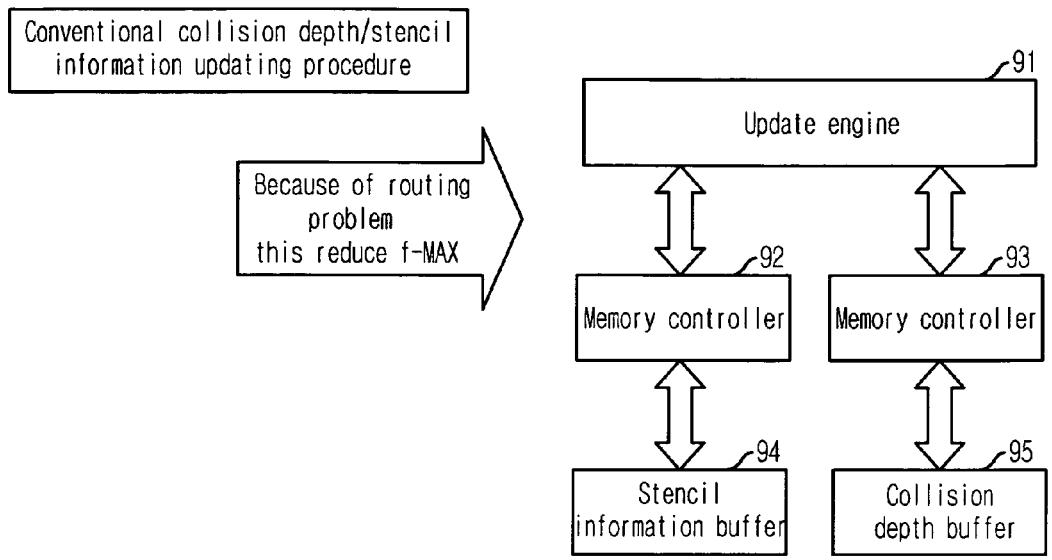
FIG. 9A is a diagram showing a conventional updating procedure for the collision depth and stencil information.
Figure 9B:
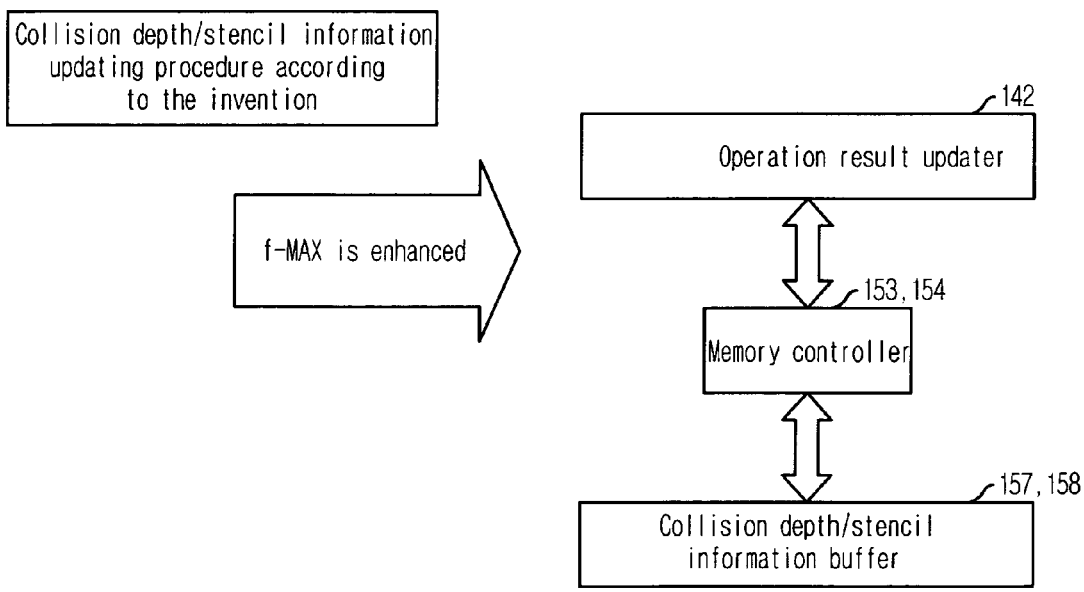
FIG. 9B is a diagram for describing an updating procedure for the collision depth and stencil information in accordance with the invention.

FIG. 9A is a diagram for describing a conventional updating procedure of the collision depth and stencil information, and FIG. 9B is a diagram for describing an updating procedure of the collision depth and stencil information of FIG. 1B in accordance with the present invention.

The conventional input/output value updating procedure stores the stencil information and collision depth in a stencil information buffer 94 and a collision depth buffer 95 through separate memory controllers 92 and 93 corresponding to the stencil information and collision depth, respectively. This storage structure lowers the hardware routing efficiency, which acts a reason that an updating procedure is progressed at lower clock. Namely, the updating procedure is performed with low performance.

However, in the procedure of storing the collision depth result according to the invention, since both the stencil information and the collision depth result are inputted/outputted to/from the operation result updater 142 as one body, the stencil information and the collision depth result are delivered together to the first collision depth/stencil information buffer 157 through the third memory controller 153.

Figure 10A:
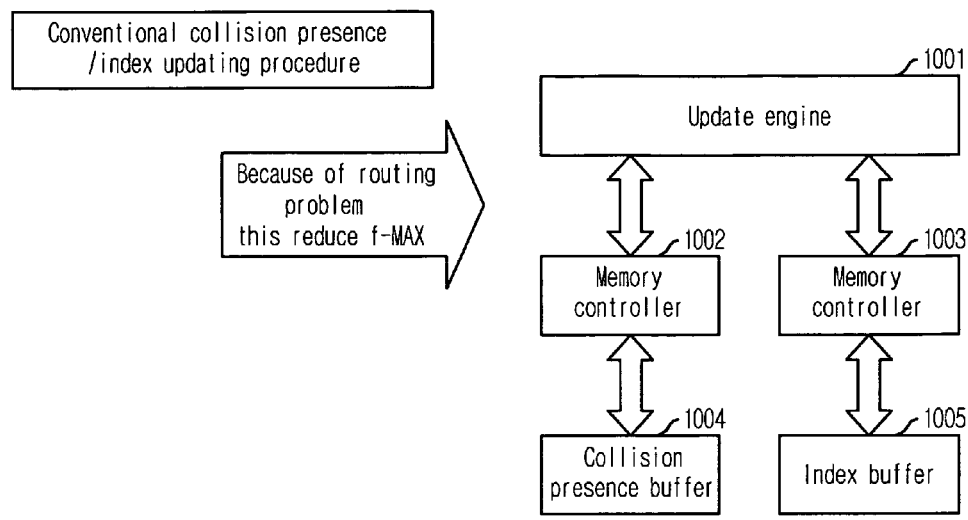
FIG. 10A is a diagram depicting a conventional updating procedure for the collision presence information and collision object index.
Figure 10B:
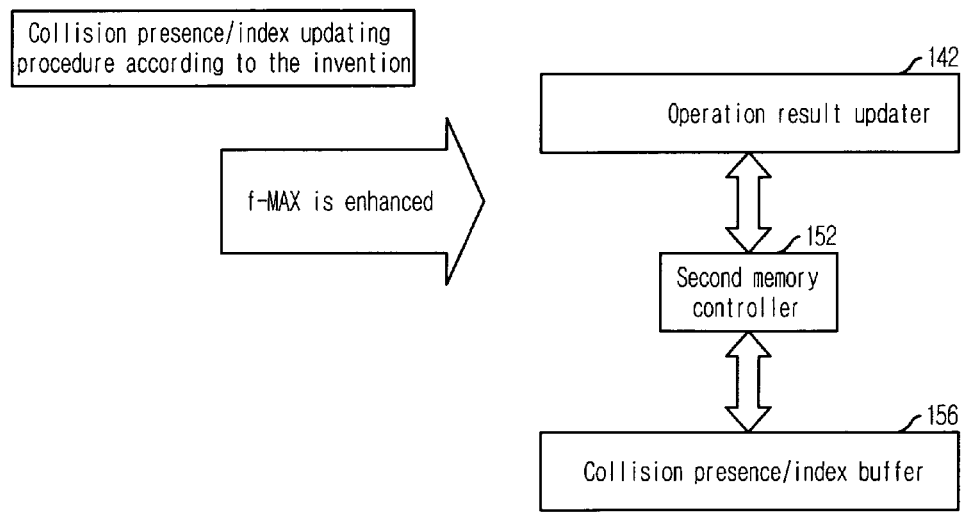
FIG. 10B is a diagram for describing an updating procedure for the collision presence information and collision object index in accordance with the invention.

FIG. 10A is a diagram for describing a conventional updating procedure of the collision presence information and collision object index, and FIG. 10B is a diagram for describing an updating procedure of the collision presence information and collision object index in accordance with the present invention.

The conventional input/output value updating procedure stores the collision presence result and collision object index in a collision presence buffer 1004 and an index buffer 1005 through corresponding separate memory controllers 1002 and 1003, respectively. This storage structure lowers the hardware routing efficiency, which acts as a reason that an updating procedure is progressed at lower clock. Namely, the updating procedure is performed with low performance.

However, in the procedure of storing the collision presence result and collision object index according to the invention, since both the collision presence result and collision object index are inputted/outputted to/from the operation result updater 142 as one body, it is possible to operate with high performance through the single second memory controller 152 and the collision depth/stencil information buffer 156.

Figure 11A:
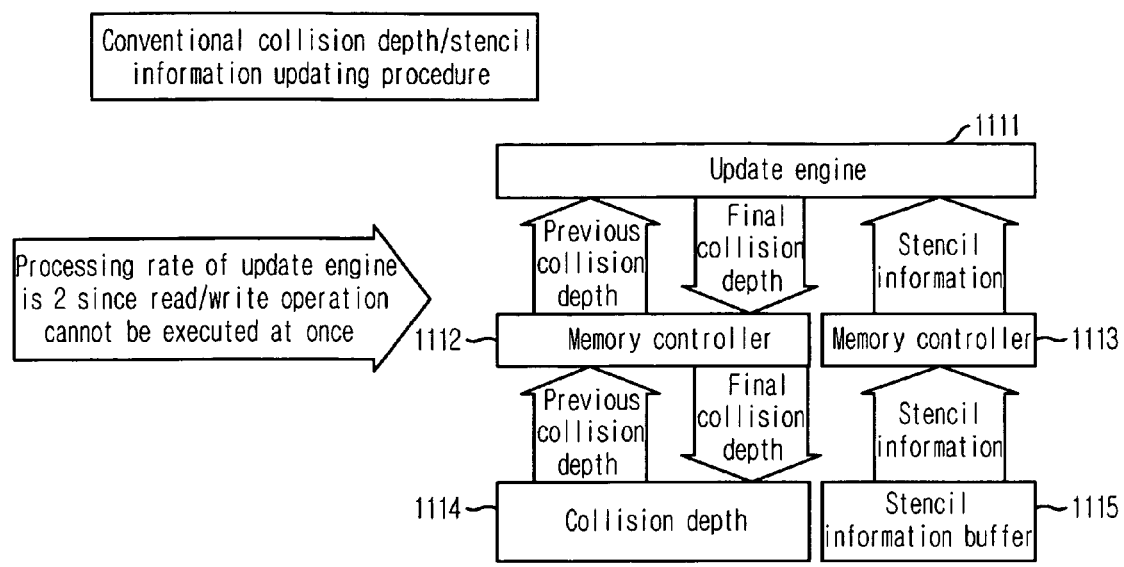
FIG. 11A is a diagram depicting a conventional updating procedure for the collision depth and stencil information.
Figure 11B:
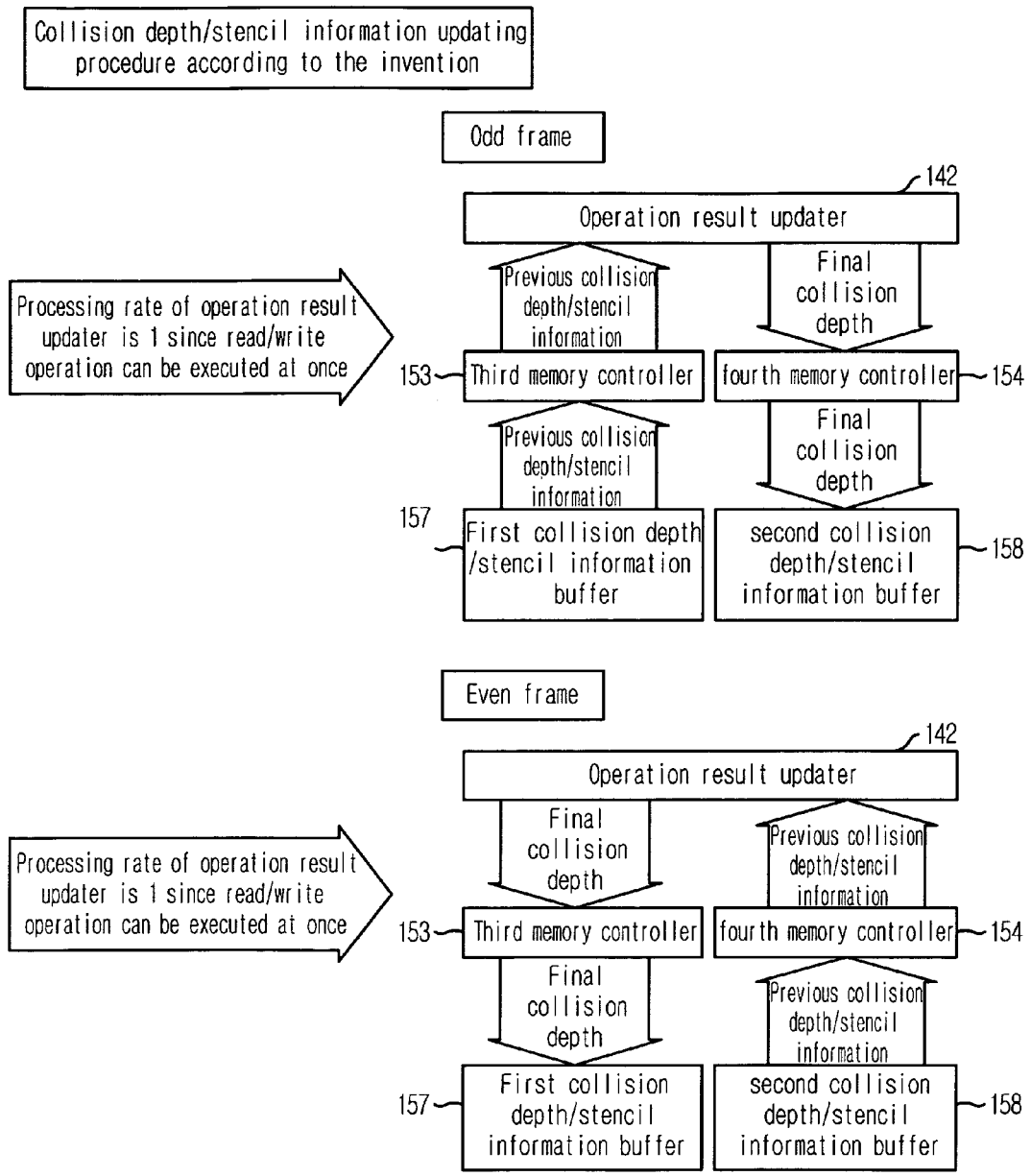
FIG. 11B is a diagram for describing an updating procedure for the collision depth and stencil information in accordance with the invention.

FIG. 11A is a diagram for describing a conventional updating procedure of the collision depth and stencil information, and FIG. 11B is a diagram for describing an updating procedure of the collision depth and stencil information of different frames in accordance with the present invention.

In the conventional collision depth result and the stencil information updating procedure, as shown in FIG. 11A, since an updating engine 1111 fetches the collision depth result from a collision depth buffer 1114 through a memory controller 1112 and then stores it immediately, the storage performance is low and a difficult exists in its design. Further, the updating engine 1111 fetches the collision depth result from a collision depth buffer 1115 through a memory controller 1113 and again stores it immediately.

However, if frames updating the collision depth result according to the invention are odd ones, the previous collision depth/stencil information are read from the first collision depth/stencil information buffer 157 through the third memory controller 153 and then delivered to the operation result updater 142. Then, the collision depth/stencil information so delivered are updated in the operation result updater 142, and the updated collision depth/stencil information are written in the second collision depth/stencil information buffer 158 through the fourth memory controller 154.

Further, if frames updating the collision depth result are even ones, the previous collision depth/stencil information are read from the second collision depth/stencil information buffer 158 through the memory controller 154 and then delivered to the operation result updater 142. After that, the collision depth/stencil information so delivered are updated in the operation result updater 142, and the updated collision depth/stencil information are written in the second collision depth/stencil information buffer 158 through the fourth memory controller 154.

This collision depth result updating procedure is unidirectional in data path. This is to improve process speed and facilitate hardware design.

Figure 12:
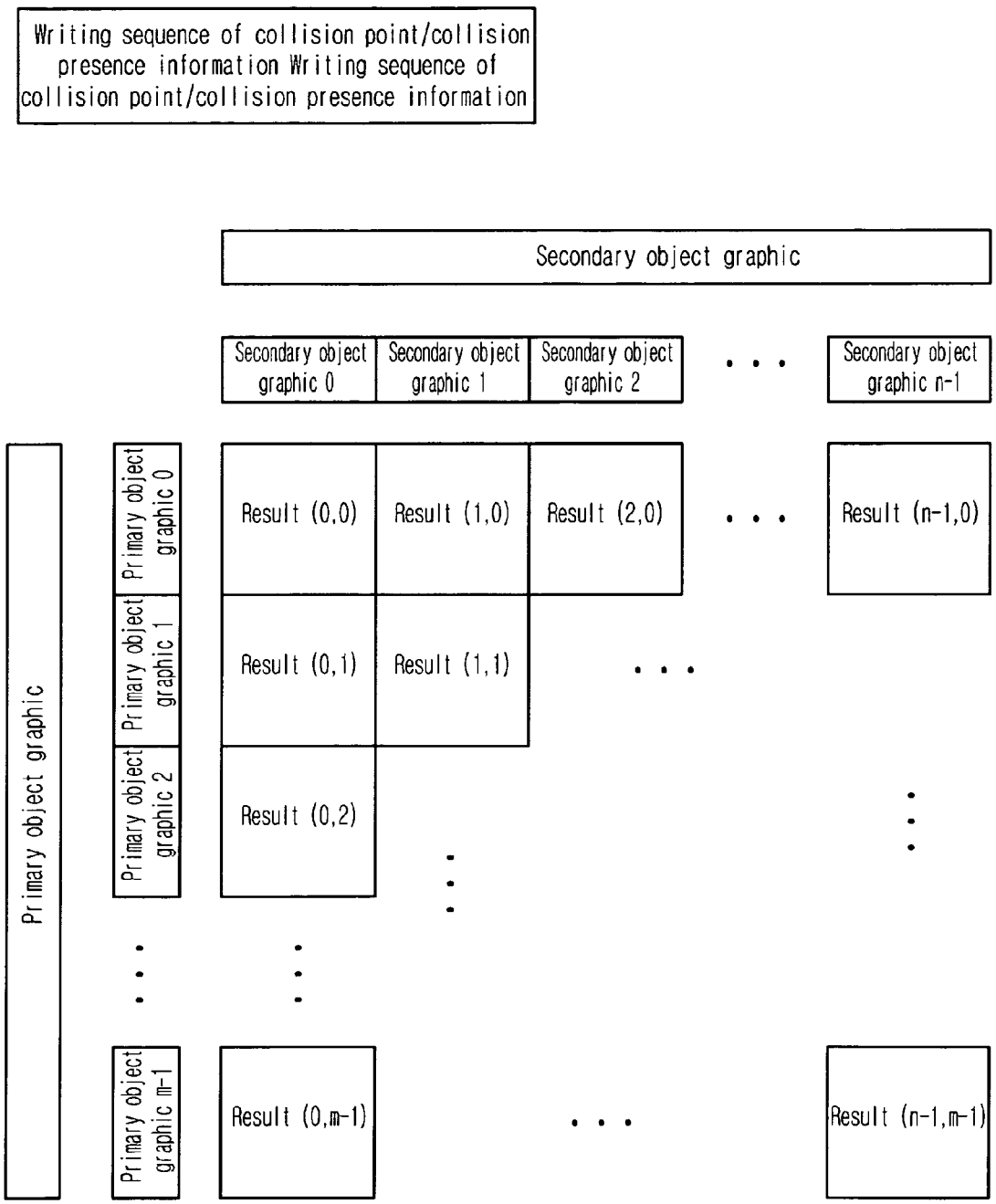
FIG. 12 is a diagram for describing a writing sequence in the collision information storage unit in accordance with the invention.

FIG. 12 is a diagram illustrating a writing sequence in the collision information storage unit in accordance with the invention.

As shown therein, in the collision point buffer 155, the collision presence/index buffer 156, and the first and second collision depth/stencil information buffers 157 and 158, writing is sequentially made based on the number m of primary object graphics and the number n of secondary object graphics for efficient writing therein if values to be updated are decided.

For example, in doing collision detection between two groups of objects, if the number of objects in the first object group is m and the number of objects in the second object group is n, the number of cases for collision detection becomes m×n. The number of memories is linearly existed, but it is a two-dimensional space in a sense. In hardware, a 1×n number of collision operations are repeatedly performed by basic unit m times. At this time, the former object group is set as primary object graphics and the latter object group is set as secondary object graphics. And the results are written in the buffers in the order of results (0, 0), (1, 0), . . . , (n, 0), wherein operation is performed from the primary object graphics 1 to m−1. Lastly, the result (m−1, n−1) is written.

As described above, the present invention repeatedly employs the geometry information loaded in the initial collision detection or transforms coordinates of the loaded geometry information to reuse them in the process of the collision information. Accordingly, the invention can improve the overall execution performance by minimizing data exchange and thus reducing the waiting time of dedicated hardware for data providing and loading. Further, the invention can detect collision between dynamic objects as well as static objects by using hardware in real-time.

Moreover, the present invention detects collision, and calculates a collision point and a collision depth if detected using the collision processing operation procedure, and compares the calculated results with previous collision information to thereby update the old collision information with the new information. As a result, the invention can support collision detection between various objects (for example, sphere, box, circular cylinder, ray, and triangle) and also can rapidly and easily output the collision presence information, the collision point, and the collision depth.

In addition, the invention adopts the copying concept, without dealing with data related to the collision objects after all separation thereof, thereby saving the storage space for the geometry information and also improving the execution performance of hardware.

Also, the present invention can be applied to the graphic systems that are applications required for real-time physical simulation and force feedback.

The method of the present invention as mentioned above may be implemented by a software program that is stored in a computer-readable storage medium such as CD-ROM, RAM, ROM, floppy disk, hard disk, optical magnetic disk, or the like. This process may be readily carried out by those skilled in the art; and therefore, details of thereof are omitted here.

The present application contains subject matter related to Korean patent application No. 2005-119396, filed with the Korean Intellectual Property Office on Dec. 8, 2005, and Korean patent application No. 2006-74924, filed with the Korean Intellectual Property Office on Aug. 8, 2006, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for processing collision information in a graphic system, comprising:
   a collision object information storage unit for loading geometry information of primary object graphics and secondary object graphics inputted from outside, and outputting the geometry information of the primary object graphics and geometry information of a plurality of secondary object graphics in which a collision detection operation with the primary object graphics is to be performed;

a collision object information transformer for transforming coordinates of the secondary object graphics to be coincided with a coordinate system that is based on the primary object graphics;

a collision information operation processor for acquiring a collision point, collision presence information, and a collision depth between the primary object graphics and the secondary object graphics simultaneously based on the geometry information of the inputted primary object graphics and the geometry information of each of the coordinate-transformed secondary object graphics by using a collision detection operation technique determined by the geometry information properties of the primary object graphics and the secondary object graphics;

a collision information storage unit for storing the collision point, the collision presence information, and the collision depth separately, wherein a collision depth before an update and a collision depth after the update are stored in two areas separately; and a collision information updating unit for updating the collision point and the collision presence information whenever the collision point and the collision presence information are newly outputted from the collision information operation processor, wherein the collision depth is updated based on the result of comparison with the previously stored collision depth.

2. The apparatus as recited in claim 1, wherein the collision object information storage unit includes:

a primary object graphic information file register for loading the geometry information of the primary object graphics inputted from the outside during an initial collision detection procedure and providing the geometry information to the collision information operation processor;

a geometry information storage unit for loading the geometry information of the secondary object graphics inputted during an initial collision detection procedure;

a secondary object graphic addressing register for storing an addressing register value for the geometry information of the loaded secondary object graphics;

a memory controller for fetching the geometry information of a plurality of secondary object graphics in which a collision detection operation with the primary object graphics is to be performed based on the stored addressing register value;

a secondary object graphic information file register for storing the geometry information of the plurality of secondary object graphics fetched by the memory controller and delivering the geometry information to the collision information operation processor; and a count register for storing the number of the primary object graphics and the number of the secondary object graphics and conveying the numbers to the collision information operation processor.

3. The apparatus as recited in claim 2, wherein the collision object information transformer includes:

a coordinate transform information file storage unit for receiving, from the outside, coordinate transform information for transforming coordinates of the secondary object graphics to be coincided with a coordinate system that is based on the primary object graphics, and storing the coordinate transform information; and a coordinate transform unit for transforming coordinates of the secondary object graphics to be coincided with a coordinate system that is based on the primary object graphics in accordance with the coordinate transform information, and providing the geometry information of the coordinate-transformed secondary object graphics to the collision information operation processor.

4. The apparatus as recited in claim 1, wherein the collision information updating unit includes:

an identification start value register for designating an initial value of a collision object index;

an index increase/decrease register for designating an increase or decrease of the collision object index;

an index generation unit for taking the designated initial value of the collision object index and creating the collision object index depending on the designated increase or decrease of the collision object index;

a collision depth comparison unit for fetching the previously stored collision depth in advance and comparing the previously stored collision depth with the derived collision depth to obtain a maximum value or a minimum value; and an operation result updating unit for updating the collision point and the collision presence information whenever they are newly outputted from the collision information operation processor, wherein the collision depth is updated based on the result of comparison with the previously stored collision depth by the collision depth comparison unit.

5. The apparatus as recited in claim 4, wherein the collision information storage unit stores the collision point, the collision presence information, and the collision depth separately, and includes:

a collision point storage unit for storing the collision point;

a first memory controller for controlling a read/write operation of the collision point by the collision point storage unit a collision presence/index storage unit for storing the collision presence information and the collision object index;

a second memory controller for controlling a read/write operation of the collision presence information and the created collision object index by the collision presence/index storage unit;

a first collision depth/stencil information storage unit for storing the collision depth and stencil information;

a third memory controller for controlling a read/write operation of the updated collision depth and the stencil information by the first collision depth/stencil information storage unit;

a second collision depth/stencil information storage unit for storing the collision depth and stencil information;

a fourth memory controller for controlling a read/write operation of the updated collision depth and the stencil information by the second collision depth/stencil information storage unit; and a storage position register for designating storage positions of the collision point, the collision presence/index, the collision depth/stencil information.

6. The apparatus as recited in claim 5, wherein the collision information operation processor judges whether the geometry information of a currently inputted collision object is valid based on an input information valid signal, and outputs a collision depth prefetch signal that is a signal to prefetch a previous collision depth stored in the collision information storage unit and an output information valid signal for the operation-processed result.

7. The apparatus as recited in claim 6, wherein the collision information updating unit updates the collision information depending on the output information valid signal and the collision depth prefetch signal, stores some of the operation results in response to an individual storage selection signal, and reads or writes the collision depth and the stencil data from or in different collision depth/stencil information storage unit in response to a collision depth result storage selection signal.

8. One or more computer-readable storage media comprising computer-readable instructions thereon which, when executed by a computer, perform a method for processing collision information in a graphic system, the method comprising the steps of:
   (a) loading geometry information of primary object graphics and secondary object graphics inputted from outside, and outputting the geometry information of the primary object graphics and geometry information of a plurality of secondary object graphics in which a collision detection operation with the primary object graphics is to be performed;
   (b) transforming coordinates of the secondary object graphics to be coincided with a coordinate system that is based on the primary object graphics;
   (c) acquiring a collision point, collision presence information, and a collision depth between the primary object graphics and the secondary object graphics simultaneously based on the geometry information of the inputted primary object graphics and the geometry information of each of the coordinate-transformed secondary object graphics by using a collision detection operation technique determined by the geometry information properties of the primary object graphics and the secondary object graphics;
   (d) storing the collision point, the collision presence information, and the collision depth separately, wherein a collision depth before an update and a collision depth after the update are stored in two areas separately; and
   (e) updating the collision point and the collision presence information whenever they are newly outputted from said step (c), wherein the collision depth is updated based on the result of comparison with the previously stored collision depth.

9. The one or more computer-readable storage media as recited in claim 8, wherein said step (a) includes the steps of:
   (a1) loading the geometry information of the primary object graphics and the secondary object graphics inputted from the outside during an initial collision detection procedure;
   (a2) storing an addressing register value for the geometry information of the loaded secondary object graphics;
   (a3) fetching the geometry information of a plurality of secondary object graphics in which a collision detection operation with the primary object graphics is to be performed based on the stored addressing register value; and
   (a4) storing the geometry information of the plurality of secondary object graphics fetched by said step (a3).

10. The one or more computer-readable storage media as recited in claim 9, wherein said step (e) includes the steps of:
   (e1) designating an initial value of a collision object index;
   (e2) designating an increase or decrease of the collision object index;
   (e3) taking the designated initial value of the collision object index and creating the collision object index depending on the designated increase or decrease of the collision object index;
   (e4) fetching the previously stored collision depth in advance and comparing the previously stored collision depth with the derived collision depth to obtain a maximum value or a minimum value; and
   (e5) updating the collision point and the collision presence information whenever they are newly outputted from said step (c), wherein the collision depth is updated based on the result of comparison with the previously stored collision depth by said step (e4).

11. The one or more computer-readable storage media as recited in claim 8, wherein said step (d) stores the collision point, the collision presence information, and the collision depth separately, and includes the steps of:
   (d1) storing the updated collision point;
   (d2) storing the updated collision presence information and the created collision object index together; and
   (d3) assigning two storage areas and storing the collision depths/stencil information before/after update in the assigned two areas separately.

12. The one or more con-muter-readable storage media as recited in claim 11, wherein said step (c) judges whether the geometry information of a currently inputted collision object is valid based on an input information valid signal, and outputs a collision depth prefetch signal that is a signal to prefetch the previously stored collision depth and an output information valid signal for the operation-processed result.

13. The one or more computer-readable storage media as recited in claim 12, wherein said step (e) updates the collision information depending on the output information valid signal and the collision depth prefetch signal, stores some of the operation results in response to an individual storage selection signal, and reads or writes the collision depth and the stencil data differently from each other in response to a collision depth result storage selection signal.

* * * * *